March 7, 1950     E. V. LAURENT     2,500,081
ROCKING AXLE STRUCTURE
Filed May 16, 1947
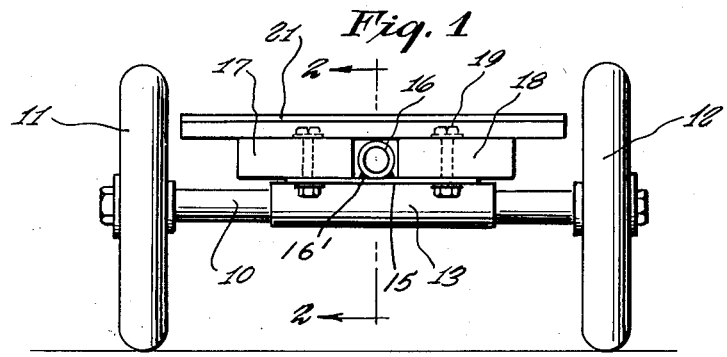
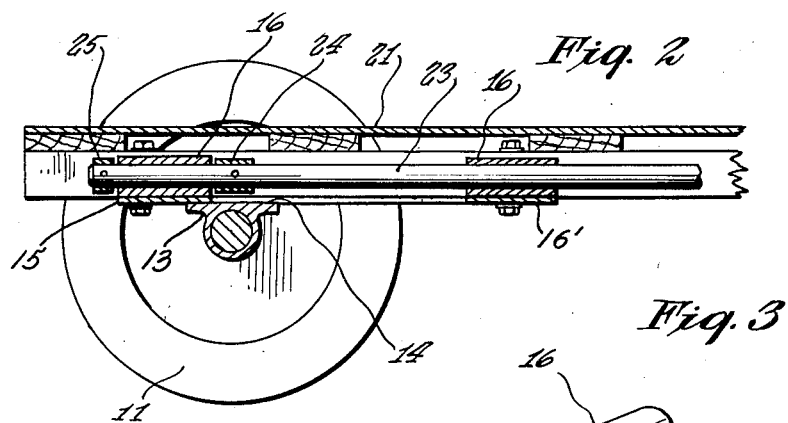
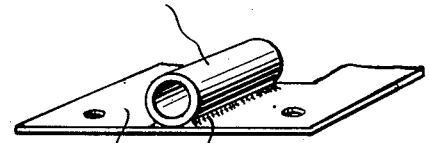
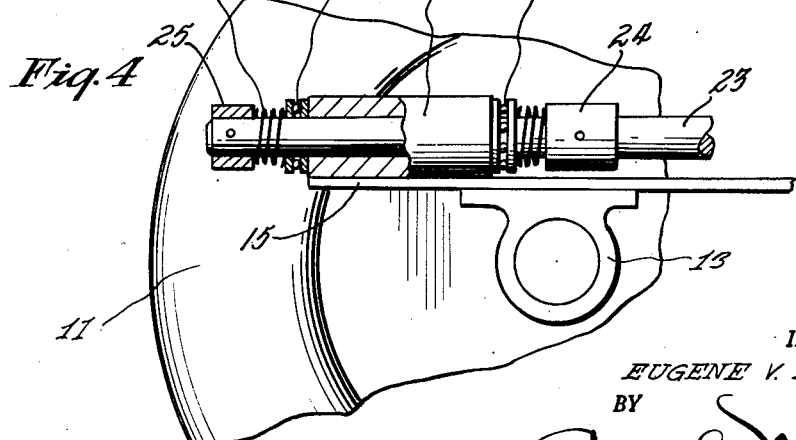
INVENTOR.
EUGENE V. LAURENT
BY Carl Miller
ATTORNEY Patented Mar. 7, 1950

2,500,081

UNITED STATES PATENT OFFICE 2,500,081

ROCKING AXLE STRUCTURE

Eugene V. Laurent, Charleston, W. Va.

Application May 16, 1947, Serial No. 748,423

2 Claims. (Cl. 280—111)

This invention relates to a rocking axle structure for trailers or other wheeled vehicles.

It is an object of the present invention to provide a rocking axle structure whereby the body assembly can rotate about a central longitudinally extending shaft provided thereon so that as the structure is drawn over the ground, the body may be kept in a horizontal position while the axle structure will adapt itself to the unevenness of the ground.

Other objects of the present invention are to provide a rocking axle structure which is of simple construction, inexpensive to manufacture and efficient in operation.

For other objects and for a better understanding of the invention, reference may be had to the following detailed description taken in connection with the accompanying drawing, in which Fig. 1 is a rear elevational view of a trailer or other wheeled vehicle having the rocking axle structure embodying the features of the present invention.

Fig. 2 is an enlarged longitudinal cross-sectional view taken on line 2—2 of Fig. 1.

Fig. 3 is a perspective view of a bearing bracket.

Fig. 4 is an enlarged fragmentary view of one end of the shaft which is arranged to take the forward and rearward thrust of the vehicle.

Referring now to the figures, 10 represents an axle on which are journalled supporting wheels 11 and 12. This axle 10 has a sleeve bearing 13 extending across the intermediate portion of the axle and having a top horizontal surface 14 on which may be rested and secured to base 15 of a bearing sleeve 16 as by welding or other suitable means. The sleeve 16 is welded to the base 15 as indicated at 16'. There are two sleeves 16, as shown in Fig. 2, and they are connected together by their base 15. One sleeve lies in rear of the axle 13 and the other sleeve lies ahead of the same. The base 15 is open to allow for the shaft 23, as shown in Fig. 2. The base 15 is connected between two planks 17 and 18 spaced apart and by means of bolts 19. The sleeve 16 will extend between the planks and longitudinally of the vehicle body or floor 21.

There may be several of the sleeve brackets 16 extending throughout the length of the body and through these sleeves is extended a shaft 23. The body 21 will be locked against axial displacement on the shaft 23 by collars 24 and 25.

It will be apparent that the body 21 may rock laterally with the axle structure and about the shaft 23 so that no strain will be placed upon the tractor or other means which may be connected to the shaft 23 at the forward end. The body can rock or rotate about the shaft 23 without causing any strain on the tractor or its coupling.

In Fig. 4, there is shown on the rear end of shaft 23 and between collars 24 and 25 and sleeve 16, ball bearing elements or units 27 and 28 and coil springs 29 whereby to take up the axial thrust between the body and the shaft upon both forward and rearward motion of the vehicle. The springs and the thrust collars will take up the shock in starting and stopping and will permit the body to turn more freely when carrying heavy loads.

While various changes may be made in the detailed construction, it shall be understood that such changes shall be within the spirit and scope of the present invention as defined by the appended claims.

Having thus set forth and disclosed the nature of this invention, what is claimed is:

1. A vehicle construction comprising a body, a shaft extending longitudinally throughout the center of the body and to which a tractor or other pulling device may be attached, an axle structure with wheels thereon for supporting the vehicle body, a sleeve connection between the axle structure and body and the longitudinally extending shaft, said body having laterally spaced pieces, said sleeve and shaft lying in the space between the pieces and having a base secured to the pieces whereby to permit the rocking adjustment of the same about the shaft, and collar means on the shaft for limiting the axial adjustment of the sleeve connection relative thereto.

2. A vehicle construction comprising a body, a shaft extending longitudinally throughout the center of the body and to which a tractor or other pulling device may be attached, an axle structure with wheels thereon for supporting the vehicle body, a sleeve connection between the axle structure and body and the longitudinally extending shaft, said body having laterally spaced pieces, said sleeve and shaft lying in the space between the pieces and having a base secured to the pieces whereby to permit the rocking adjustment of the same about the shaft, and collar means on the shaft for limiting the axial adjustment of the sleeve connection relative thereto, and thrust bearing means included in the means for preventing the axial adjustment of the sleeve upon the longitudinally extending shaft whereby to take up the shock in starting and stopping and to permit free rocking adjustment when operating under heavy loads.

EUGENE V. LAURENT.

REFERENCES CITED

The following references are of record in the file of this patent:

UNITED STATES PATENTS

| Number | Name | Date |
|---|---|---|
| 843,691 | McIntosh | Feb. 12, 1907 |
| 2,364,842 | Feigelson | Dec. 12, 1944 |